United States Patent
Iwasaki (10) Patent No.: US 7,771,853 B2
(45) Date of Patent: Aug. 10, 2010

(54) PATTERNED MAGNETIC MEDIUM, MAGNETIC RECORDING MEDIUM AND MAGNETIC STORAGE DEVICE

(75) Inventor: Tomio Iwasaki, Tsukuba (JP)

(73) Assignee: Hitachi, Ltd., Tokyo (JP)

( * ) Notice: Subject to any disclaimer, the term of this patent is extended or adjusted under 35 U.S.C. 154(b) by 123 days.

(21) Appl. No.: 11/956,424

(22) Filed: Dec. 14, 2007

(65) Prior Publication Data

US 2008/0144218 A1    Jun. 19, 2008

(30) Foreign Application Priority Data

Dec. 14, 2006   (JP)   ............... 2006-336476

(51) Int. Cl.
*G11B 5/66* (2006.01)
(52) U.S. Cl. .................................. 428/833.2
(58) Field of Classification Search ............... None
See application file for complete search history.

(56) References Cited

U.S. PATENT DOCUMENTS 7,423,842 B2 *   9/2008   Fujita et al. ............... 360/135
2004/0247940 A1 *  12/2004  Chang et al. ............... 428/694 T
2006/0029834 A1 *  2/2006  Suwa et al. ............... 428/848.5
2008/0019047 A1 *  1/2008  Takeda ........................ 360/135

FOREIGN PATENT DOCUMENTS

JP     2005-122876     5/2005

* cited by examiner

*Primary Examiner*—Holly Rickman
(74) *Attorney, Agent, or Firm*—Antonelli, Terry, Stout & Kraus, LLP.

(57) ABSTRACT

A patterned magnetic medium includes: a substrate; a soft magnetic underlying film, a nonmagnetic film, an intermediate film and a recording layer which are formed on a principal surface of the substrate; a first protective film formed in contact with the recording film; a second protective film formed in contact with the first protective film; and a third protective film formed in contact with the second protective film. Moreover, the recording layer has a pattern structure formed by making a magnetic film come into contact with a concavo-convex pattern of a nonmagnetic material. The first protective film and the third protective film include carbon as the main constituent element and the second protective film is a wet-coated polymer film. High adhesion between carbon and the wet-coated polymer film can prevent peeling off and the wet-coated polymer film as a cushioning material absorbs impact.

17 Claims, 6 Drawing Sheets

PATTERNED MAGNETIC MEDIUM, MAGNETIC RECORDING MEDIUM AND MAGNETIC STORAGE DEVICE

CLAIM OF PRIORITY

The present application claims priority from Japanese application JP 2006-336476 filed on Dec. 14, 2006, the content of which is hereby incorporated by reference into this application.

BACKGROUND OF THE INVENTION

1. Field of the Invention

The present invention relates to a patterned magnetic medium, a magnetic recording medium and a magnetic storage device.

2. Description of the Related Art

As a recording medium for a calculator and the like, a magnetic recording medium such as a hard disk has heretofore been in heavy usage. Also as a recording medium for a home appliance, a portable telephone and the like, a magnetic recording medium having a large recording capacity has recently attracted attention. The heavy usage of such a magnetic recording medium has increased the needs for a magnetic recording medium which enables recording with small power consumption. Moreover, as to the magnetic recording medium, surface recording density has heretofore been improved. However, for a downsizing, an even more dramatic increase in a recording capacity and the like, further improvement in the surface recording density has been demanded. As a candidate for the magnetic recording medium that can realize such significant improvement in the surface recording density, there has been proposed a magnetic recording medium having a recording layer formed to have a concavo-convex pattern, such as a patterned magnetic medium (see, for example, Japanese Patent Laid-open Publication No. 2005-122876).

SUMMARY OF THE INVENTION

However, since a distance between a magnetic recording medium and a slider tends to be reduced year by year, problems such as damage to the slider and peel-off of a surface of the magnetic recording medium may be caused by collision between the magnetic recording medium and the slider. Therefore, it is required to prevent such problems from occurring even if the magnetic recording medium collides against the slider. Particularly, a recording layer made of a magnetic material is required to be made unlikely to be deformed in a direction parallel to a surface of a substrate (hereinafter referred to as a substrate surface direction).

In order to solve the problems described above, the inventors of the present invention have conducted keen studies to obtain a means for making a recording layer in a patterned magnetic medium unlikely to be deformed. Specifically, the patterned magnetic medium includes: a substrate; a soft magnetic underlying film a nonmagnetic film, an intermediate film and the recording layer which are formed on a principal surface of the substrate; a first protective film formed in contact with the recording layer; and a second protective film formed in contact with the first protective film. Moreover, the recording layer has a pattern structure formed by making a magnetic film come into contact with a concavo-convex pattern of a nonmagnetic material. As a result of the studies, the inventors have found out that the recording layer made of a magnetic material is unlikely to be deformed in the case where the first protective film includes carbon as the main constituent element and the second protective film is a wet-coated polymer film. Furthermore, it is preferable to provide a third protective film which is formed in contact with the second protective film and which includes carbon as the main constituent element. The inventors have further found it effective to set constituent elements of the magnetic film to be Co, Cr and Pt, to set a concentration of the Cr to from 15 at. % to 25 at. %, to set a concentration of the Pt to from 10 at. % to 20 at. % and to set the wet-coated polymer film to be any one selected from a group consisting of H-containing polysiloxane (HSQ), methyl-containing polysiloxane (MSQ), polyimide, polyamideimide, polyamide, di-vinyl-siloxane bis benzo-cyclo-butene (DVS-BCB), poly-monochloro-paraxylylene (parylene C) and poly-paraxylylene (parylene N).

Note that, in the present specification, a main constituent element means an element having a highest atomic percent concentration.

The present invention makes it possible to provide a highly reliable and functional magnetic recording medium with which defects in the magnetic recording medium and a slider won't occur even if the magnetic recording medium collides against the slider.

DETAILED DESCRIPTION OF THE PREFERRED EMBODIMENTS

Hereinafter, embodiments of the present invention will be described in detail by referring to the drawings.

Embodiment 1

Figure 1:
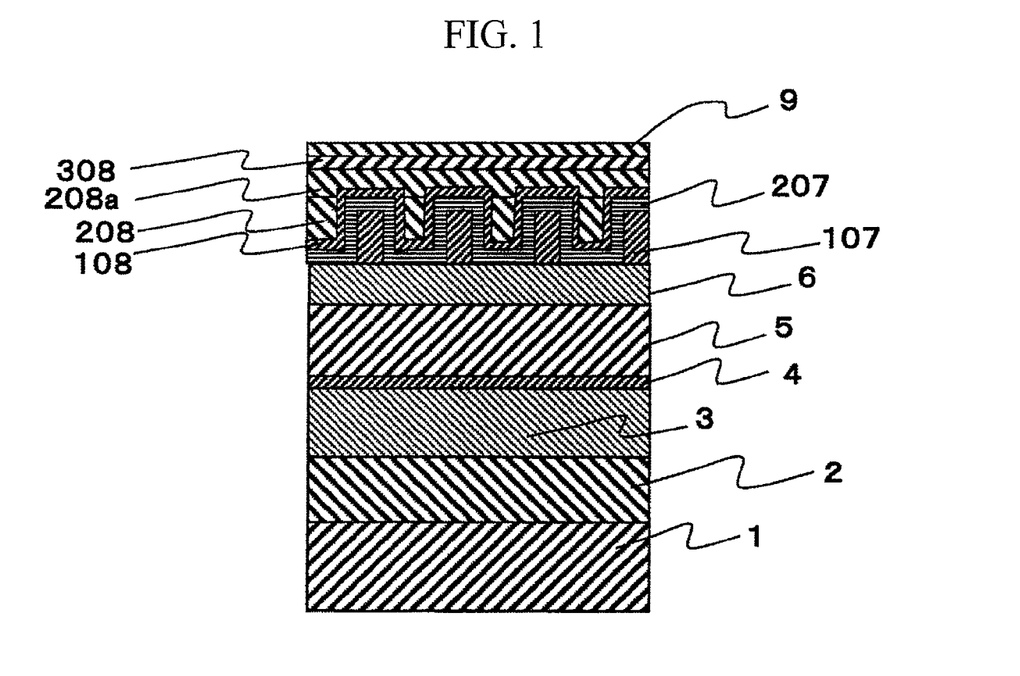
FIG. 1 is a cross-sectional view of a patterned magnetic medium that is Embodiment 1 of the present invention.
Figure 2:
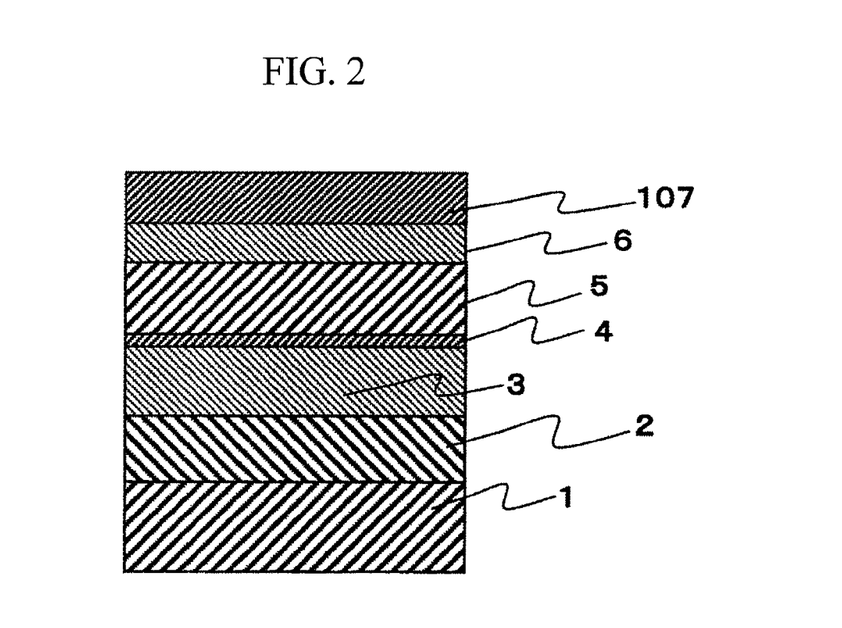
FIG. 2 is a view showing a step of manufacturing a recording layer in the patterned magnetic medium that is Embodiment 1 of the present invention.
Figure 3:
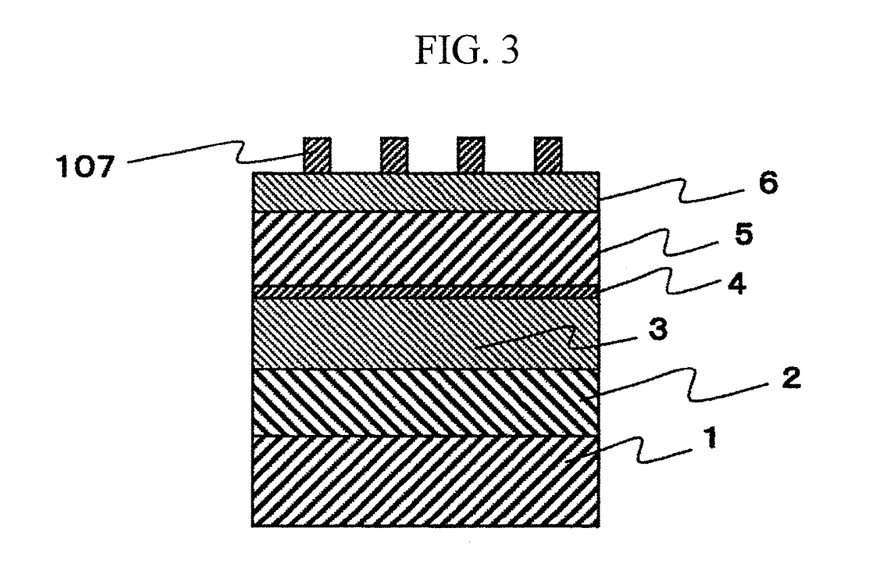
FIG. 3 is a view showing a step of manufacturing the recording layer in the patterned magnetic medium that is Embodiment 1 of the present invention.
Figure 4:
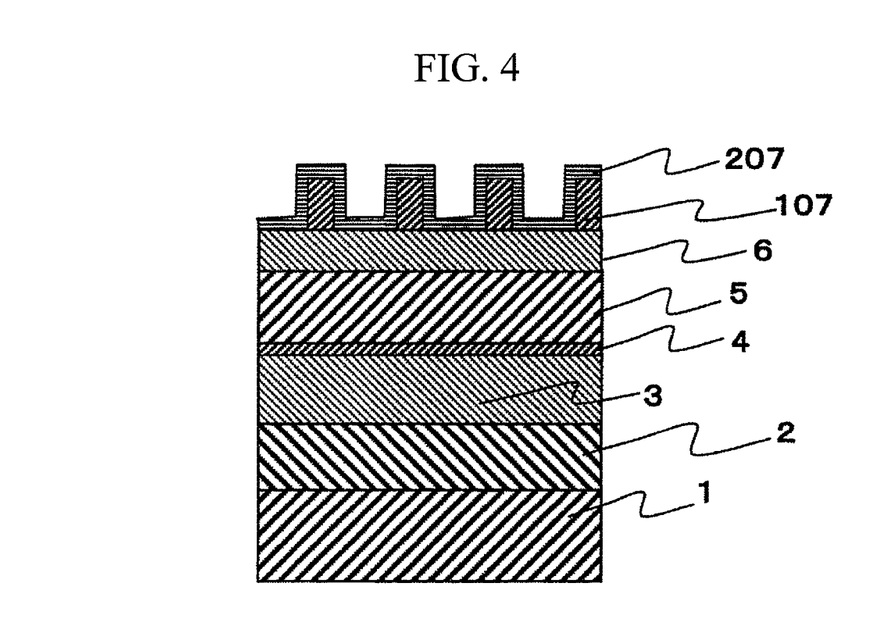
FIG. 4 is a view showing a step of manufacturing the recording layer in the patterned magnetic medium that is Embodiment 1 of the present invention.
Figure 5:
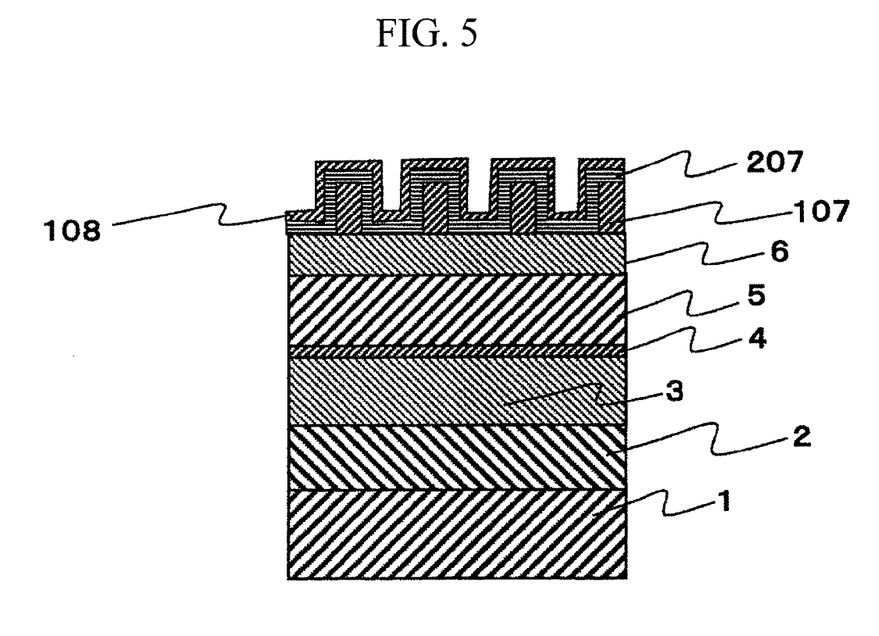
FIG. 5 is a view showing a step of manufacturing the recording layer in the patterned magnetic medium that is Embodiment 1 of the present invention.
Figure 6:
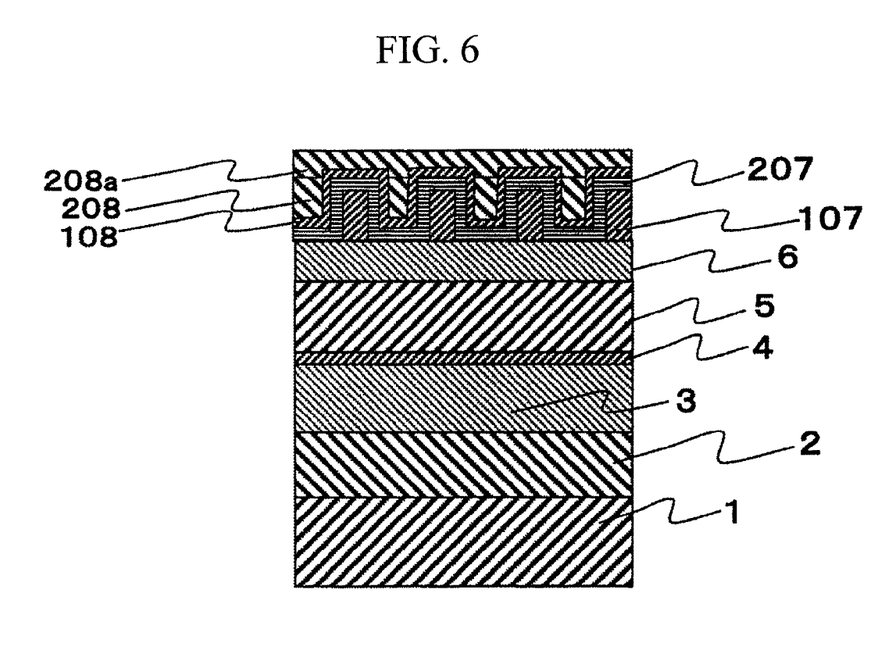
FIG. 6 is a view showing a step of manufacturing the recording layer in the patterned magnetic medium that is Embodiment 1 of the present invention.

First, FIG. 1 shows a cross-sectional structure of a patterned magnetic medium that is Embodiment 1 of the present invention. As shown in FIG. 1, the patterned magnetic medium of this embodiment has a configuration in which a precoat layer 2, a soft magnetic film 3, a nonmagnetic film 4, a soft magnetic film 5, an intermediate film 6 and a nonmagnetic film 107 are formed on a substrate 1 by use of, for example, a DC magnetron sputtering method. After the nonmagnetic material 107 is patterned, a magnetic film (recording layer) 207 is formed thereon. Moreover, a first protective film 108, second protective films 208 and 208a and a third protective film 308 are formed on the magnetic film and a lubrication layer 9 is further formed on the third protective film. For example, a pattern structure of the nonmagnetic material 107 shown in FIG. 1 is formed in the following manner. For example, the nonmagnetic film 107 is formed with the nonmagnetic material by use of the DC magnetron sputtering method or the like (FIG. 2) and a pattern is formed by use of a mask patterned by nanoimprint, for example (FIG. 3). The nanoimprint is a method for forming a pattern by pressing at high temperature a formed mold having a concavo-convex pattern structure and, thereafter, being cooled down. In formation of the pattern as shown in FIG. 3, dry etching or wet etching by use of a mask having a pattern may be employed besides the nanoimprint. Moreover, pattern formation by self-organization may be used. Next, the magnetic film 207 is formed by use of, for example, the DC magnetron sputtering method or the like (FIG. 4). Thereafter, the first protective film 108 including carbon as the main constituent element is formed by use of, for example, a chemical vapor deposition method, the DC magnetron sputtering method or the like (FIG. 5). In this case, the chemical vapor deposition method characteristically facilitates filling up groove bottoms and groove edges in the pattern. Meanwhile, the sputtering method characteristically facilitates formation of a hard highquality film on a side face of the pattern. Subsequently, the second protective films 208 and 208a are further formed by use of wet-coated polymer films such as H-containing polysiloxane (HSQ), methyl-containing polysiloxane (MSQ), polyimide, polyamideimide, polyamide, di-vinyl-siloxane bis benzo-cyclo-butene (DVS-BCB), parylene C and parylene N, for example (FIG. 6). Among the above, use of polyimide characteristically provides a feature of resistance to a hot and humid environment. The second protective film 208a may be omitted depending on an application amount. The second protective film formed by use of such a wet-coated polymer film is preferable in terms of production and cost-effective because of its advantage of having a flat surface without performing planarization using chemical mechanical polishing (CMP) or the like. Furthermore, the third protective film 308 including carbon as the main constituent element is formed on the second protective film and the lubrication layer 9 is formed thereon.

Here, description will be given of an effect achieved by forming the first protective film 108, the second protective film 208 and the third protective film 308 on the magnetic film 207.

In a patterned magnetic medium, a magnetic film that is a recording layer is sometimes formed in a concavo-convex pattern. When the protective film is formed by use of a wet-coated polymer film as described above, the surface thereof is flattened by itself. Thus, a planarization step such as polishing can be omitted and the production can be simplified. Therefore, it is preferable that a wet-coated polymer film that is the second protective film 208 is formed so as to have it upper surface set above convex parts of a concavo-convex pattern of the magnetic film 207. However, it is not preferable to form the second protective film by use of a wet-coated polymer film directly on the magnetic film 207 without forming the first protective film 108, because of poor adhesion between a magnetic film and a wet-coated polymer film. Use of the first protective film 108 including carbon as the main constituent element has an effect of improving the adhesion. For example, when it is assumed that adhesion between the second protective film 208 and the magnetic film 207 is 1, adhesion between the first protective film 108 and the magnetic film 207 is about 7 and adhesion between the first protective film 108 and the second protective film 208 is about 3. Such a ratio of adhesion is obtained by using a molecular dynamics simulation to analyze activation energy required to separate the first protective film 108, the second protective film 208 and the magnetic film 207 from each other, which are formed in contact with each other. The molecular dynamics simulation is a method for calculating a position of each atom at each time by calculating force acting on each atom through a potential between atoms and solving a Newton's equation of motion based on the force, as described in Journal of Applied Physics, vol. 54 (published in 1983), page 4877, for example. By using this calculation method, a difference between potential energy in a state where two films are bonded to each other and potential energy in a state where the films are separated from each other is calculated and defined as adhesive fracture energy. Large adhesive fracture energy means high adhesion.

Moreover, for improvement of the adhesion, it is preferable to form the first protective film 108 not only above the convex parts of the concavo-convex pattern but also on the groove bottoms and side faces of the concavo-convex pattern.

In order to maintain mechanical strength, it is more preferable to further provide the third protective film 308 including carbon as the main constituent element on the second protective film 208. In this case, use of the third protective film consisting of carbon with high hardness has an effect of improving strength. Moreover, the second protective film is a wet-coated polymer film and is soft due to its small Young's modulus. Thus, when external force acts on the medium in collision against a slider or the like, the second protective film serves as a cushioning material for allowing the force to escape. Therefore, the above structure is considered to be desirable. Moreover, a combination of carbon and a wet-coated polymer film achieves good adhesion as described above.

Moreover, it is preferable that constituent elements of the magnetic film are set to be Co, Cr and Pt, a concentration of the Cr is set to from 15 at. % to 25 at. % and a concentration of the Pt is set to from 10 at. % to 20 at. %. Accordingly, the magnetic film can be formed to achieve a high degree of evenness where sizes of crystal grains are around 10 nanometers. Moreover, local concentration of internal stress can be prevented. Thus, adhesion between the magnetic film and the carbon of the first protective film is improved.

Embodiment 2

Figure 7:
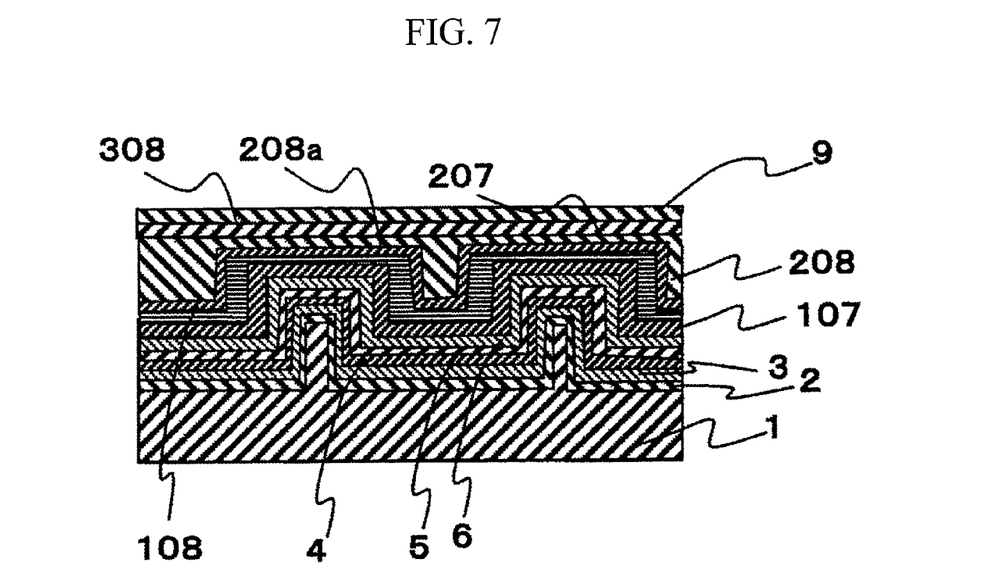
FIG. 7 is a cross-sectional view of a patterned magnetic medium that is Embodiment 2 of the present invention.

Next, FIG. 7 shows a cross-sectional view of a patterned magnetic medium that is Embodiment 2 of the present invention. What is different from Embodiment 1 (FIG. 1) is that, while the nonmagnetic material 107 has the pattern structure in Embodiment 1, a substrate 1 has a pattern structure in Embodiment 2. In Embodiment 2, after the substrate 1 is patterned by use of nanoimprint, for example, film formation processes are simply executed one after another. Thus, Embodiment 2 is characterized by a simpler manufacturing process compared with Embodiment 1 including a patterning step between film formations.

In Embodiment 2, the same effects as those in Embodiment 1 are also achieved by providing a first protective film 108, a second protective film 208 and a third protective film 308 on a magnetic film 207.

Embodiment 3

Figure 8:
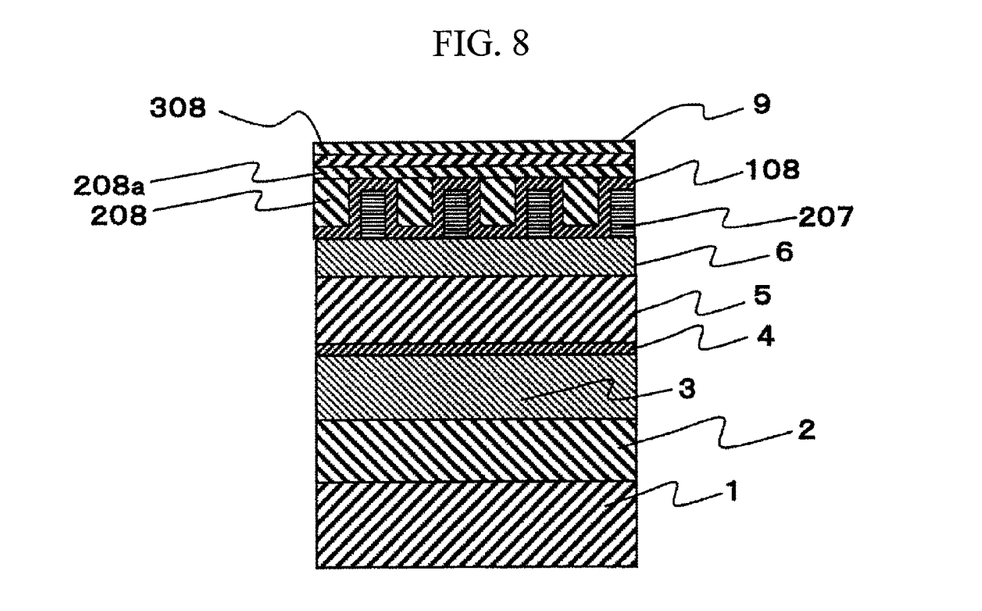
FIG. 8 is a cross-sectional view of a patterned magnetic medium that is Embodiment 3 of the present invention.

Next, FIG. 8 shows a cross-sectional view of a patterned magnetic medium that is Embodiment 3 of the present invention. What is different from Embodiment 1 (FIG. 1) is that, while the nonmagnetic material 107 has a patterned structure in Embodiment 1, there is no nonmagnetic material 107 and a magnetic film 207 has a patterned structure in Embodiment 3. Embodiment 3 is characterized by a simpler manufacturing process than that in Embodiment 1 since there is no film formation step for the nonmagnetic material 107.

In Embodiment 3, the same effects as those in Embodiment 1 are also achieved by providing a first protective film 108, a second protective film 208 and a third protective film 308 on the magnetic film 207.

Embodiment 4

Figure 9:
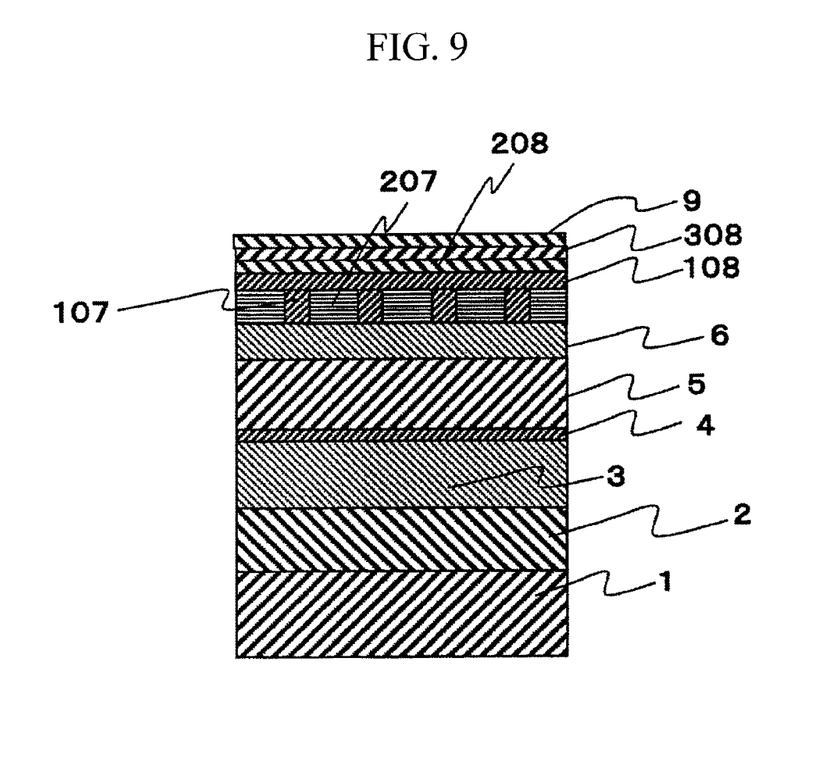
FIG. 9 is a cross-sectional view of a magnetic recording medium having a granular structure that is Embodiment 4 of the present invention.

Next, FIG. 9 shows a cross-sectional view of a magnetic recording medium that is Embodiment 4 of the present invention. What is different from Embodiment 1 (FIG. 1) is that, while the nonmagnetic material 107 has the patterned structure in Embodiment 1, a nonmagnetic material 107 is made of a material deposited on a grain boundary in formation of a magnetic film 207 in Embodiment 4. A structure in which the nonmagnetic material 107 is deposited on the grain boundary of the magnetic film 207 is called a granular structure. Embodiment 4 is different from Embodiment 1 also in that a first protective film is formed on a flat surface. Embodiment 4 is characterized by a simpler manufacturing process than that in Embodiment 1 since there is no patterning step.

In Embodiment 4, effects are also achieved such as improving adhesion by providing a first protective film 108, a second protective film 208 and a third protective film 308 on the magnetic film 207 and improving reliability by using the second protective film 208 as a cushioning material.

Embodiment 5

Figure 10:
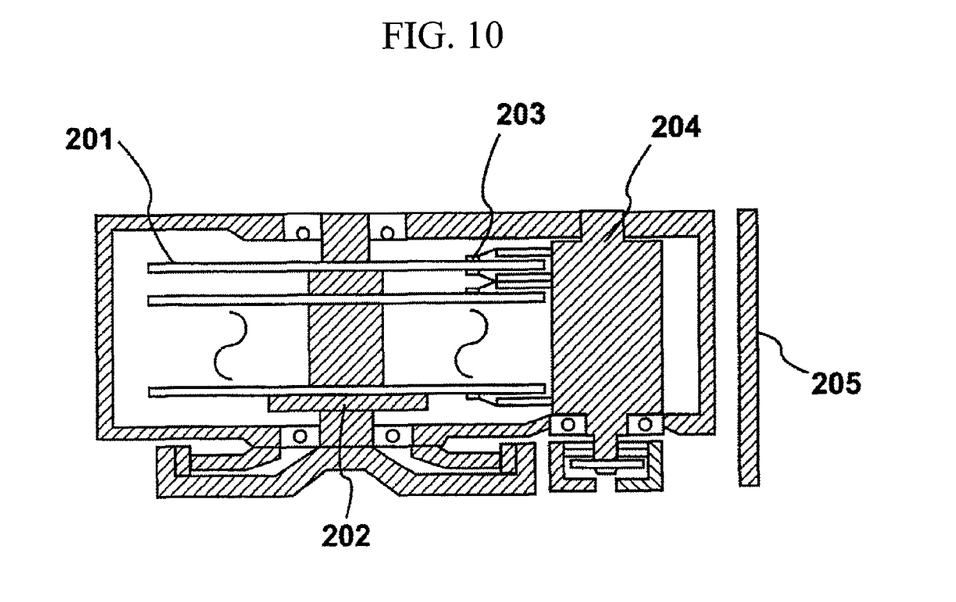
FIG. 10 is a cross-sectional view of a magnetic storage device that is Embodiment 5 of the present invention.
Figure 11:
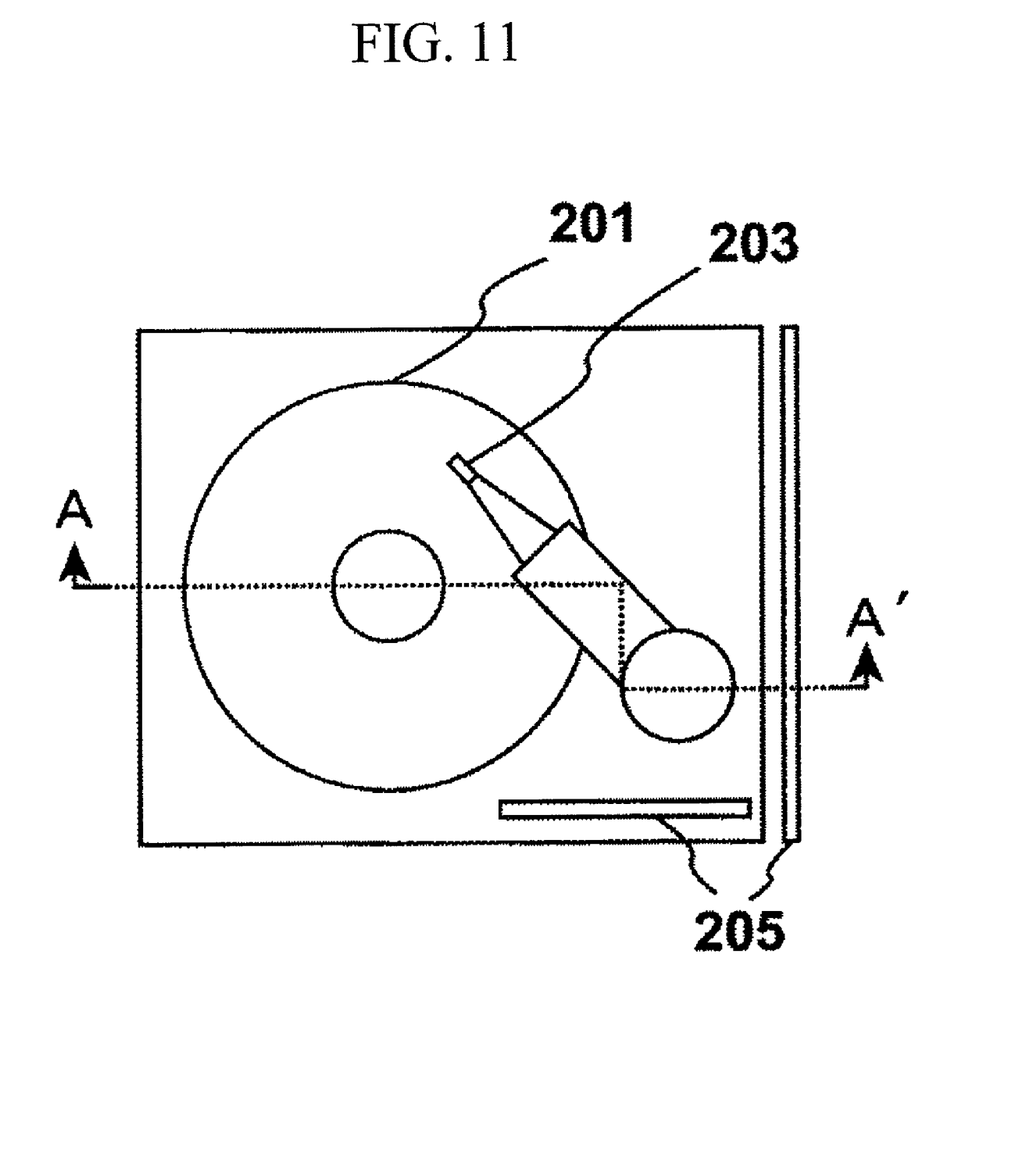
FIG. 11 is a schematic view of the magnetic storage device that is Embodiment 5 of the present invention when viewed from above.

Next, FIGS. 10 and 11 show schematic views of a magnetic storage device that is Embodiment 5 of the present invention.

FIG. 11 is a view of the magnetic storage device when viewed from above. FIG. 10 is a cross-sectional view along the line A-A' in FIG. 11. The magnetic storage device of this embodiment includes: a patterned magnetic medium 201; a drive part 202 for rotationally driving the patterned magnetic medium; a magnetic head 203 including a recording part and a reproduction part; a driving means 204 for moving the magnetic head 203 in relation to the patterned magnetic medium 201; and a recording and reproduction signal processing means 205 for inputting a signal of the magnetic head 203 and reproducing an output signal from the magnetic head 203. Here, the patterned magnetic medium 201 is a medium as described in Embodiment 1. Specifically, the patterned magnetic medium 201 is formed by using materials and a structure which prevent tensile strain from being caused in a direction parallel to a surface of a substrate of the medium when the medium is hit by the head so that the patterned magnetic medium 201 shows higher resistance to a hit by the head. Thus, there is an advantage of high reliability as a magnetic storage device by suppressing defects caused by hits between the slider and the patterned magnetic medium 201 even if a head floating amount (distance between a head and a protective film) in operation of the magnetic storage device is set to 10 nm or less. Note that the same effects are also achieved by using those described in Embodiments 2 and 3 or the magnetic recording medium in Embodiment 4 as the patterned magnetic medium 201.

What is claimed is:

1. A patterned magnetic medium comprising:
   a substrate;
   a soft magnetic film, a nonmagnetic film, an intermediate film, and a recording layer having a concavo-convex pattern structure, which are formed on a principal surface of the substrate;
   a first protective film which is formed along the pattern structure on the recording layer and consisting of carbon; and
   a second protective film which is formed on the first protective film and is a wet-coated polymer film;
   a third protective film which is formed on the second protective film and consisting of carbon; and
   a lubrication layer which is formed on said third protective film;
   wherein a lower surface of the second protective film is in concave parts of the concavo-convex pattern and an upper surface of the second protective film is above concavo-convex patterns of the recording layer and the first protective film.

2. The patterned magnetic medium according to claim 1, wherein the wet-coated polymer film is any one selected from a group consisting of H-containing polysiloxane, methyl-containing polysiloxane, polyimide, polyamideimide, polyamide, DVS-BCB, parylene C and parylene N.

3. The patterned magnetic medium according to claim 1, wherein constituent elements of the recording layer are Co, Cr and Pt, a concentration of the Cr is from 15 at. % to 25 at. % and a concentration of the Pt is from 10 at. % to 20 at. %.

4. The patterned magnetic medium according to claim 2, wherein constituent elements of the recording layer are Co, Cr and Pt, a concentration of the Cr is from 15 at. % to 25 at. % and a concentration of the Pt is from 10 at. % to 20 at. %.

5. The patterned magnetic medium according to claim 1, wherein
   the substrate has a concavo-convex pattern and
   the concavo-convex pattern of the recording layer derives from the concavo-convex pattern of the substrate.

6. The patterned magnetic medium according to claim 1, further comprising:
   a nonmagnetic material having a concavo-convex pattern on the intermediate film,
   wherein the recording layer is formed on the nonmagnetic material.

7. The patterned magnetic medium according to claim 1, wherein the concavo-convex pattern of the recording layer is formed by patterning the recording layer.

8. A magnetic recording medium comprising:
   a substrate;
   a soft magnetic film, a nonmagnetic film and an intermediate film and a recording layer having a granular structure in which grains of a magnetic material are separated by oxides, which are formed on a principal surface of the substrate;
   a first protective film which is formed on the recording layer and consisting of carbon;
   a second protective film which is formed on the first protective film and is a wet-coated polymer film;
   a third protective film which is formed on the second protective film and consisting of carbon; and a lubrication layer which is formed on the third protective film.

9. The magnetic recording medium according to claim 8, wherein the wet-coated polymer film is any one selected from a group consisting of H-containing polysiloxane, methyl-containing polysiloxane, polyimide, polyamideimide, polyamide, DVS-BCB, parylene C and parylene N.

10. The magnetic recording medium according to claim 8, wherein constituent elements of the recording layer are Co, Cr and Pt, a concentration of the Cr is from 15 at. % to 25 at. % and a concentration of the Pt is from 10 at. % to 20 at. %.

11. The magnetic recording medium according to claim 9, wherein constituent elements of the recording layer are Co, Cr and Pt, a concentration of the Cr is from 15 at. % to 25 at. % and a concentration of the Pt is from 10 at. % to 20 at. %.

12. A magnetic storage device comprising:
a drive part for driving the patterned magnetic medium according to claim 1 in a recording direction;
a magnetic head including a recording part and a reproduction part;
a means for moving the magnetic head in relation to the patterned magnetic medium; and
a recording and reproduction processing means for inputting a signal of the magnetic head and reproducing an output signal from the magnetic head.

13. A magnetic storage device comprising:
a drive part for driving the magnetic recording medium according to claim 8 in a recording direction;
a magnetic head including a recording part and a reproduction part;
a means for moving the magnetic head in relation to the magnetic recording medium; and
a recording and reproduction processing means for inputting a signal of the magnetic head and reproducing an output signal from the magnetic head.

14. A patterned magnetic medium comprising:
a magnetic film having a concavo-convex pattern structure;
a first protective film which is formed along the pattern structure on the magnetic film and consisting of carbon;
a second protective film which is formed on the first protective film, and is a polymer film;
a third protective film which is formed on the second protective film and consisting of carbon; and
a lubrication layer which is formed on said third protective film.

15. The patterned magnetic medium according to claim 14, wherein the second protective film is a wet-coated polymer film having a property of forming a flat surface without chemical and mechanical polishing.

16. The patterned magnetic medium according to claim 15, wherein the first protective film is a chemical vapor deposited film or a DC magnetron sputtered film.

17. The patterned magnetic medium according to claim 15, wherein the magnetic film has crystal grains of a size of about 10 nanometers.

* * * * *